(12) United States Patent
Hatanaka et al.

(10) Patent No.: US 10,332,710 B2
(45) Date of Patent: Jun. 25, 2019

(54) INPUT DEVICE

(71) Applicant: DENSO CORPORATION, Kariya, Aichi-pref. (JP)

(72) Inventors: Shinji Hatanaka, Kariya (JP); Motoki Tachiiri, Nishio (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 16 days.

(21) Appl. No.: 15/540,716

(22) PCT Filed: Feb. 8, 2016

(86) PCT No.: PCT/JP2016/000635
§ 371 (c)(1),
(2) Date: Jun. 29, 2017

(87) PCT Pub. No.: WO2016/143254
PCT Pub. Date: Sep. 15, 2016

(65) Prior Publication Data
US 2017/0358415 A1    Dec. 14, 2017

(30) Foreign Application Priority Data

Mar. 11, 2015   (JP) .................................. 2015-048774

(51) Int. Cl.
*H01H 53/00*    (2006.01)
*H01H 50/64*    (2006.01)
(Continued)

(52) U.S. Cl.
CPC ............. *H01H 50/64* (2013.01); *G06F 3/016* (2013.01); *G06F 3/0354* (2013.01);
(Continued)

(58) Field of Classification Search
CPC ....... G06F 3/0354; G06F 3/016; H01H 50/64; H01H 50/36; H01H 50/18; H01H 50/04
(Continued)

(56) References Cited

U.S. PATENT DOCUMENTS

| 2004/0056745 | A1* | 3/2004 | Watanabe | G06F 3/016 335/220 |
| 2011/0140818 | A1* | 6/2011 | Hatanaka | G05G 5/05 335/219 |

(Continued)

FOREIGN PATENT DOCUMENTS

| JP | 2014217176 A | 11/2014 |
| JP | 2015011383 A | 1/2015 |
| JP | 2015125552 A | 7/2015 |

*Primary Examiner* — Shawki S Ismail
*Assistant Examiner* — Lisa N Homza
(74) *Attorney, Agent, or Firm* — Harness, Dickey & Pierce, P.L.C.

(57) ABSTRACT

In an input device in which an electromagnetic force generated by applying current to a coil acts on an operation knob as a reaction force of an operation force, a repulsion magnet is disposed at one of a coil side yoke, a first yoke, or a second yoke to generate a repulsive force to a first magnet or a second magnet so as to offset the resultant of a first attraction force of the first magnet to the coil side yoke or the first yoke and a second attraction force of the second magnet to the coil side yoke or the second yoke.

3 Claims, 8 Drawing Sheets

(51) Int. Cl.
  *G06F 3/0354* (2013.01)
  *H01H 50/18* (2006.01)
  *H01H 50/36* (2006.01)
  *H01H 50/44* (2006.01)
  *G06F 3/01* (2006.01)
  *H01H 25/04* (2006.01)
  *H01H 3/00* (2006.01)

(52) U.S. Cl.
  CPC ......... *G06F 3/03543* (2013.01); *H01H 25/04* (2013.01); *H01H 50/18* (2013.01); *H01H 50/36* (2013.01); *H01H 50/44* (2013.01); *H01H 2003/008* (2013.01); *H01H 2215/00* (2013.01); *H01H 2231/026* (2013.01)

(58) Field of Classification Search
  USPC .......................................................... 335/147
  See application file for complete search history.

(56) References Cited

U.S. PATENT DOCUMENTS

| | | | |
|---|---|---|---|
| 2016/0077590 A1* | 3/2016 | Tachiiri | G06F 3/0354 345/184 |
| 2016/0195937 A1* | 7/2016 | Tachiiri | G05G 9/047 345/157 |
| 2016/0259429 A1* | 9/2016 | Hisatsugu | G06F 3/0338 |
| 2016/0328018 A1* | 11/2016 | Hisatsugu | G06F 3/016 |
| 2017/0032915 A1* | 2/2017 | Hatanaka | B60K 35/00 |
| 2017/0060271 A1* | 3/2017 | Hisatsugu | H02K 41/031 |
| 2017/0300135 A1* | 10/2017 | Hisatsugu | H02K 41/031 |
| 2017/0358415 A1* | 12/2017 | Hatanaka | H01H 50/18 |
| 2018/0004315 A1* | 1/2018 | Hatanaka | G06F 3/0354 |
| 2018/0081446 A1* | 3/2018 | Wakuda | G06F 3/016 |
| 2018/0240630 A1* | 8/2018 | Kozai | H01H 50/14 |

* cited by examiner

INPUT DEVICE

CROSS REFERENCE TO RELATED APPLICATIONS

This application is a U.S. National Phase Application under 35 U.S.C. 371 of International Application No. PCT/JP2016/000635 filed on Feb. 8, 2016 and published in Japanese as WO 2016/143254 A1 on Sep. 15, 2016. This application is based on and claims the benefit of priority from Japanese Patent Application No. 2015-048774 filed on Mar. 11, 2015. The entire disclosures of all of the above applications are incorporated herein by reference.

TECHNICAL FIELD

The present disclosure relates to an input device.

BACKGROUND ART

An input device (input device) of Patent Literature 1 has a tabular fixed yoke fixed to a surface of a circuit board arranged to be horizontal, and plural coils are fixed to the other surface of the circuit board. Moreover, a tabular movable yoke is arranged adjacent to the plural coils, and plural magnets are fixed on a surface of the movable yoke opposing the coil. An operation knob is connected to the movable yoke.

The movable yoke and the plural magnets are movable in an x-axis direction and a y-axis direction together with the operation knob. When current flows through the plural coils, electromagnetic force occurs in the plural coils, due to the current and magnetic flux generated by the plural magnets. The electromagnetic force acts as reaction force of operation over the operation knob moved in the x-axis direction or the y-axis direction.

PRIOR ART LITERATURES

Patent Literature

Patent Literature 1: JP 2014-217176 A

SUMMARY OF INVENTION

In Patent Literature 1, an attraction force is generated by the magnet in a z-axis direction between the magnet and the fixed yoke. Therefore, when the movable core and the magnet are moved by operation of the operation knob, frictional force occurs between sliding components. In this case, the operation feeling might get worse.

Therefore, in the prior application (Japanese patent application No. 2013-268746) which is disclosed as JP 2015-125552 A, inventors study arranging movable yokes, on which a magnet is fixed, to sandwich a fixed yoke from the both sides so as to cancel the attraction force in the z-axis direction.

However, depending on variation in the distance between the magnet and the fixed yoke or variation in the dimension of the magnet itself, variation occurs in the attraction force in the z-axis direction. In this case, it is difficult to completely offset the mutual attraction force.

It is a purpose of the present disclosure to provide an input device in which influence caused by a difference in the attraction forces of the magnets arranged at the both sides of the yoke can be effectively controlled.

According to an aspect of the present disclosure, an input device in which an operation force is input in a direction along an imaginary operation plane includes:

a coil defined by winding a wire;

a coil side yoke having a plane shape inserted in the coil;

a first yoke and a second yoke each having a plane shape and arranged parallel at both sides of the coil side yoke;

a first magnet that generates magnetic flux between the coil side yoke and the first yoke, the first magnet being arranged on a surface of the coil side yoke and the first yoke opposing with each other;

a second magnet that generates magnetic flux between the coil side yoke and the second yoke, the second magnet being arranged on a surface of the coil side yoke and the second yoke opposing with each other; and an operation knob connected to the coil side yoke or the first and second yokes, into which the operation force is inputted.

An electromagnetic force generated by applying current to the coil acts on the operation knob as a reaction force of the operation force; and a repulsion magnet is disposed at one of the coil side yoke, the first yoke, and the second yoke to generate a repulsive force to the first magnet or the second magnet so as to cancel a sum of a first attraction force of the first magnet to the coil side yoke or the first yoke, and a second attraction force of the second magnet to the coil side yoke or the second yoke.

If variation occurs in size of each component of the input device or dimension between the components, a difference arises between the first attraction force of the first magnet and the second attraction force of the second magnet, such that the attraction forces cannot be offset. In this case, the difference between the attraction forces remains as a resultant. When the operation knob is operated, a frictional force is caused by this resultant. As a result, variation occurs in the operation feeling of the operation knob.

In the present disclosure, the repulsion magnet is disposed to generate repulsive force, at either the coil side yoke, the first yoke or the second yoke to cancel the resultant of the first attraction force and the second attraction force. Therefore, it becomes possible to restrict effectively the influence caused by the difference in the attraction forces of the first and second magnets.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
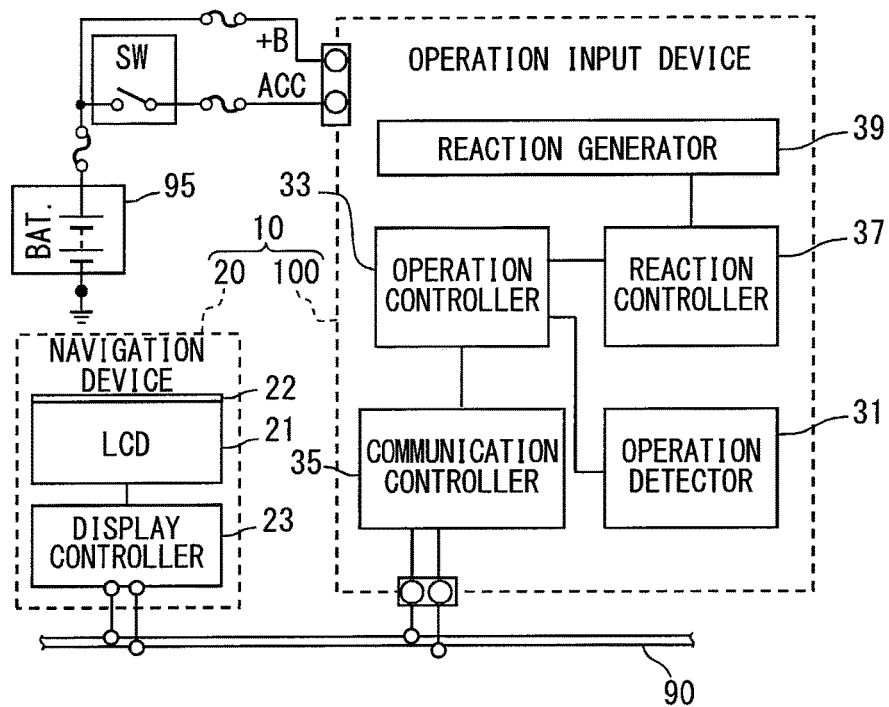
FIG. 1 is a view illustrating a display system equipped with an operation input device according to a first embodiment.

Embodiments of the present disclosure will be described in the following with reference to drawings. In the following, components corresponding between embodiments may be denoted by identical reference numerals, and duplicate description of such components may be omitted. In cases where only a part of the configuration of an embodiment is described, the remaining part of the configuration of the embodiment may have a corresponding part of an earlier-described embodiment applied thereto. Also, besides combinations of configurations explicitly disclosed concerning individual embodiments, partial combinations of a plurality of embodiment configurations not explicitly disclosed are also allowed provided that such combinations do not cause any combinational problem. Furthermore, combinations, not explicitly disclosed, of configurations described concerning embodiments and modifications are also regarded as disclosed by the following description.

(First Embodiment)

Figure 2:
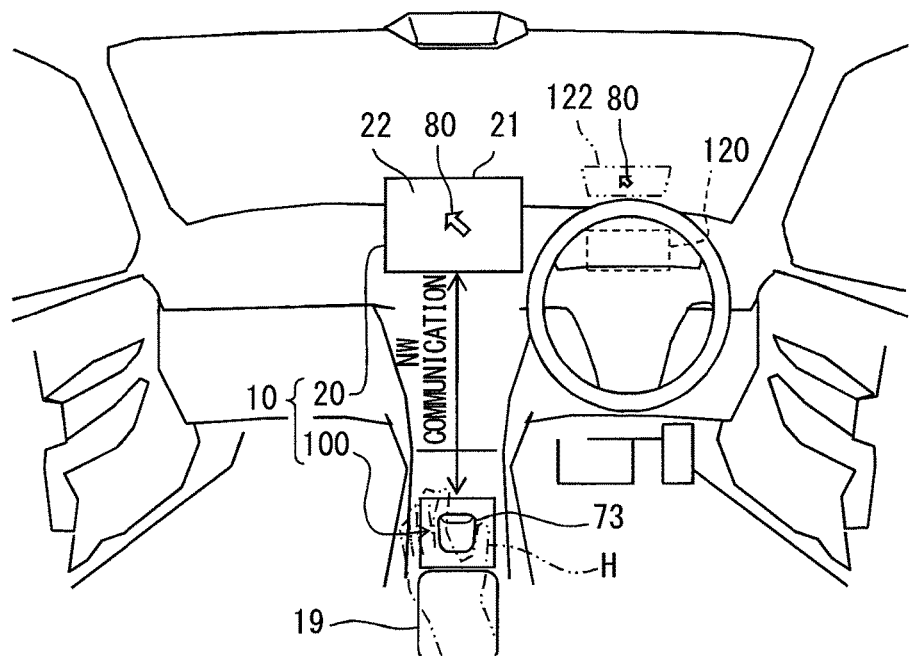
FIG. 2 is a view illustrating a location of the operation input device in a cabin.

Referring to FIG. 1, an operation input device 100 according to a first embodiment is mounted in a vehicle and configures, in a vehicle interior, a display system 10 along with other devices including, for example, a navigation device 20 or a head-up display device 120 (see FIG. 2). The operation input device 100 is, as shown in FIG. 2, installed in a center console of the vehicle adjacently to a palm rest 19 and includes an operation knob 73 exposed in an area within reach of the operator's hand. When an operating force is applied to the knob 73 by the operator's hand H, the knob 73 is displaced in the direction in which the operating force is applied.

The navigation device 20 is installed in an instrument panel of the vehicle and includes a display screen 22 exposed to face toward the driver seat. The display screen 22 displays a plurality of icons associated with predetermined functions and a pointer 80 used to select an optional icon. When a horizontal operating force is applied to the operation knob 73, the pointer 80 moves in the direction of the operating force on the display screen 22. The navigation device 20 is, as shown in FIGS. 1 and 2, coupled to a communication bus 90 and can communicate, for example, with the operation input device 100 via a network. The navigation device 20 includes a display controller 23 to draw images for display on the display screen 22 and a liquid crystal display 21 to consecutively display images drawn by the display controller 23 on the display screen 22.

Components of the operation input device 100 will be described in detail below. The operation input device 100 is, as shown in FIG. 1, coupled to the communication bus 90 and an external battery 95. The operation input device 100 can communicate, via the communication bus 90, with the navigation device 20 installed separately from the operation input device 100. From the battery 95, the operation input device 100 is supplied with power necessary to operate the components thereof.

The operation input device 100 is electrically configured with components such as a communication controller 35, an operation detector 31, a reaction force generator 39, a reaction force controller 37, an operation controller 33 etc.

The communication controller 35 outputs information processed by the operation controller 33 to the communication bus 90. Also, the communication controller 35 collects information outputted from other in-vehicle devices to the communication bus 90 and outputs the collected information to the operation controller 33.

The operation detector 31 detects the position of the operation knob 73 (see FIG. 2) moved by an operating force applied to the operation knob 73. The operation detector 31 outputs operation information representing the detected position of the operation knob 73 to the operation controller 33.

The reaction force generator 39 is configured to make the operation knob 73 generate an operation reaction force and includes an actuator, for example, a voice coil motor. The reaction force generator 39 applies, for example, when the pointer 80 (see FIG. 2) overlaps an icon on the display screen 22, an operation reaction force to the operation knob 73 (see FIG. 2) so as to cause, by means of a so-called reaction force feedback, the operator to have a pseudo-feeling of icon.

The reaction force controller 37 includes, for example, a microcomputer to perform various calculations. The reaction force controller 37 controls, based on reaction force information obtained from the operation controller 33, the direction and magnitude of the operation reaction force to be applied from the reaction force generator 39 to the operation knob 73.

The operation controller 33 includes, for example, a microcomputer to perform various calculations. The operation controller 33 obtains operation information detected by the operation detector 31 and outputs the obtained information to the communication bus 90 via the communication controller 35. The operation controller 33 also calculates the direction and magnitude of the operation reaction force to be applied to the operation knob 73 (see FIG. 2) and outputs the calculation results to the reaction force controller 37 as reaction force information.

Figure 3:
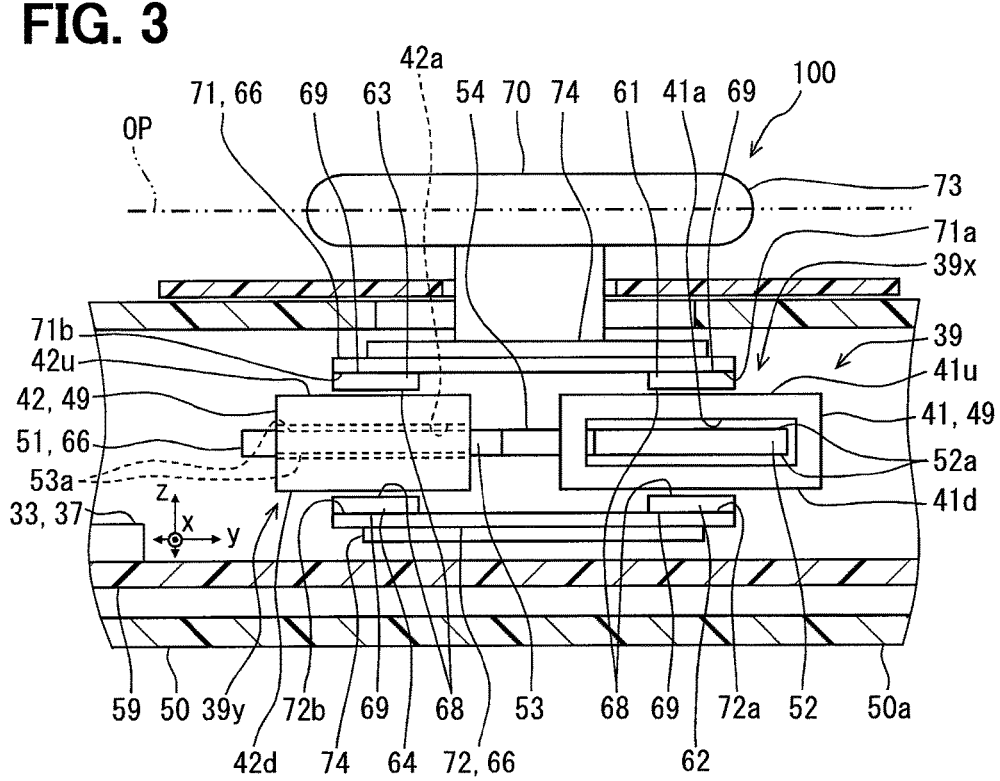
FIG. 3 is a sectional view illustrating a mechanical configuration of the operation input device.

The operation input device 100 has a mechanical configuration including, as shown in FIG. 3, a movable portion 70 and a fixed portion 50.

The movable portion 70 includes a knob base 74 and the operation knob 73. The knob base 74 holds a pair of movable yokes 71 and 72 being described later. The movable portion 70 is movable relative to the fixed portion 50 in the x-axis and y-axis directions along an imaginary operation plane OP. The movable range of the movable portion 70 in each of the x-axis and y-axis directions is pre-defined by the fixed portion 50. When the movable portion 70 is released from the operating force applied thereto, the movable portion 70 returns to a reference position therefor.

The fixed portion 50 includes a housing 50a, a sliding board 50b (FIG. 11, FIG. 12) and a circuit board 59 and holds a fixed yoke 51 being described later. The housing 50a accommodates components such as the circuit board 59 and the reaction force generator 39 while relatively movably supporting the movable portion 70. The sliding board 50*b* is a guide plate when the movable portion 70 is moved, and is fixed in the housing 50*a*. The circuit board 59 is fixed in the housing 50*a* such that the surface of the circuit board 59 extends along the operation plane OP. The circuit board 59 is mounted with, for example, a microcomputer constituting the operation controller 33 and the reaction force controller 37.

Figure 4:
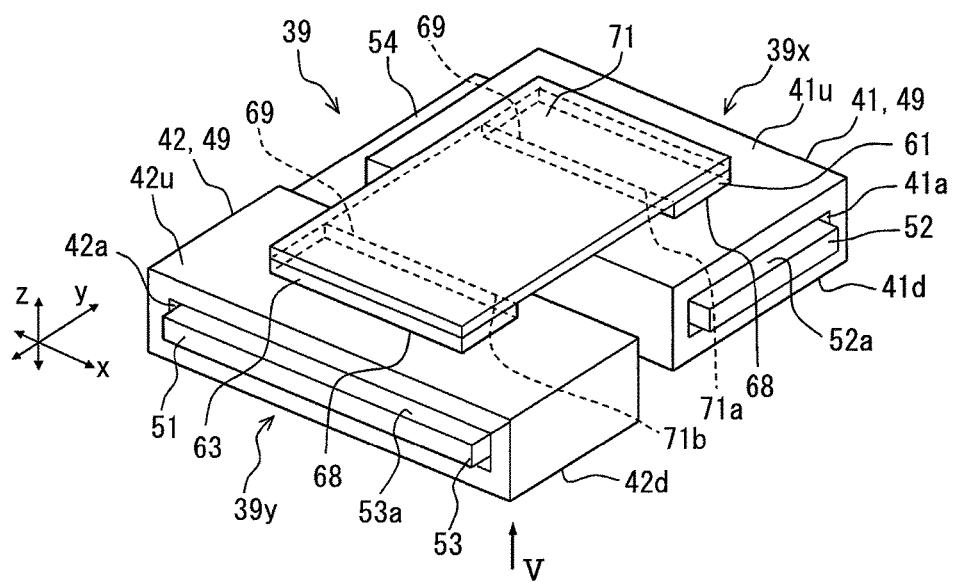
FIG. 4 is a perspective view of a reaction force generator.
Figure 5:
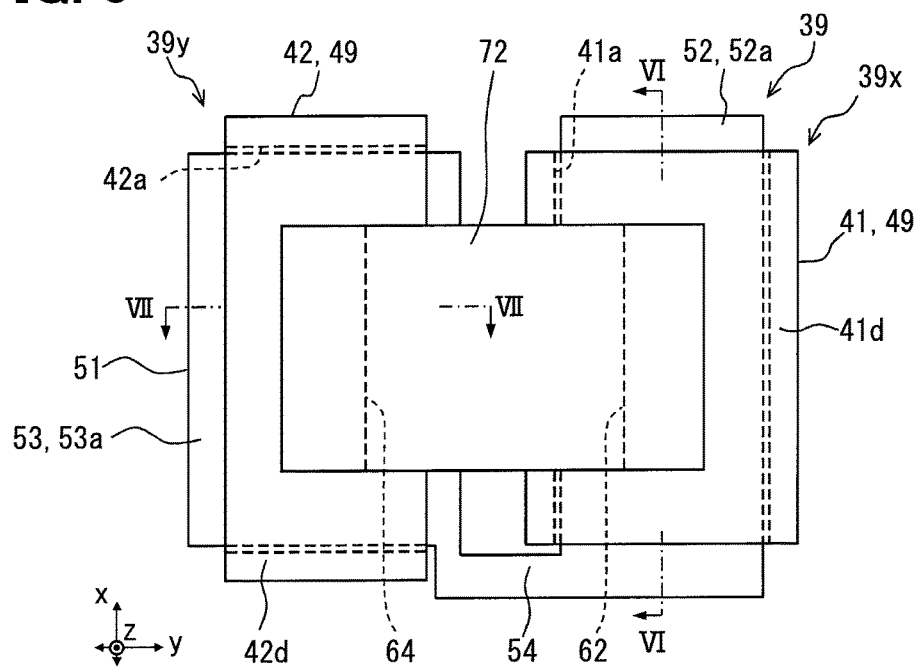
FIG. 5 is a bottom view of the reaction force generator seen from an arrow V of FIG. 4.

The reaction force generator 39 shown in FIGS. 3 to 5 carries out a reaction force feedback between the movable portion 70 and the fixed portion 50. The reaction force generator 39 includes a first voice coil motor (VCM) 39*x* and a second VCM 39*y*, a fixed yoke 51, and two movable yokes 71 and 72. VCMs function as two sets of actuator.

The first VCM 39*x* has a first coil 41, two magnets 61 and 62, a fixed yoke 51 (first coil side yoke portion 52), and movable yokes 71 and 72. The second VCM 39*y* has a second coil 42, two magnets 63 and 64, a fixed yoke 51 (second coil side yoke portion 53), and movable yokes 71 and 72. In the following, the coils 41 and 42, magnets 61 to 64, fixed yoke 51, and movable yokes 71 and 72 will be described in order in detail.

The coils 41 and 42 are each formed by winding a non-magnetic wire, for example, a copper wire into a winding 49 of a flat cylindrical shape. In each of the coils 41 and 42, the cross-section perpendicular to the winding axis direction of the winding 49 is rectangular. The winding 49 of each of the coils 41 and 42 is formed by winding a wire until the cylindrical wall of the coil is, for example, about 3 mm thick. In the coils 41 and 42, accommodation space 41*a* and 42*a* surrounded by the inner peripheries of the respective windings 49 are formed to extend in the winding axis directions of the respective windings 49. The coils 41 and 42 are electrically coupled to the reaction force controller 37 via wiring patterns formed over the circuit board 59. The windings 49 of the coils 41 and 42 are respectively applied with electric currents by the reaction force controller 37.

The coils 41 and 42 are disposed slightly apart from each other along the y axis. The coils 41 and 42 are fixed to the fixed portion 50, for example, to the circuit board 59 such that the winding axis of each winding 49 extends along the operation plane OP. In a coil (hereinafter referred to as the "first coil") 41, the winding axis extends along the x axis. In the other coil (hereinafter referred to as the "second coil") 42, the winding axis extends along the y axis. The coils 41 and 42 have a pair of coil surfaces 41*u* and 41*d* and a pair of coil surfaces 42*u* and 42*d*, respectively, all extending along the operation plane OP. The coil surfaces 41*u* and 42*u* of the coils 41 and 42 are the upperside coil surfaces of the respective coils and face the operation knob 73. The coil surfaces 41*d* and 42*d* of the coils 41 and 42 are the underside coil surfaces of the respective coils and face the circuit board 59. The coil surfaces 41*u*, 41*d*, 42*u*, and 42*d* of the coils 41 and 42 are approximately rectangular having sides extending along the x or y axis.

The magnets 61 to 64 are, for example, neodymium magnets each shaped into an approximately rectangular plate having a longitudinal direction. The two magnets 61 and 62 are disposed apart from each other in the z-axis direction substantially perpendicular to the operation plane OP and are arranged along the z-axis direction. Similarly, the other two magnets 63 and 64 are disposed apart from each other in the z-axis direction and are arranged along the z-axis direction. The magnets 61 to 64 each have a magnetized surface 68 and a mounting surface 69 both of which are smooth and flat. The magnetized surface 68 and the mounting surface 69 of each of the magnets 61 to 64 have mutually different magnetic poles (see FIGS. 6 and 7 also).

The mounting surfaces 69 of the two magnets 61 and 63 are attached to the movable yoke 71 such that their longer sides extend along the y axis. The magnetized surface 68 of the magnet 61 attached to the movable yoke 71 faces the upperside coil surface 41*u* of the first coil 41 across a predetermined distance in the z-axis direction. The magnetized surface 68 of the magnet 63 attached to the movable yoke 71 faces the upperside coil surface 42*u* of the second coil 42 across a predetermined distance in the z-axis direction.

The mounting surfaces 69 of the other two magnets 62 and 64 are attached to the movable yoke 72 such that their longer sides extend along the x axis. The magnetized surface 68 of the magnet 62 attached to the movable yoke 72 faces the underside coil surface 41*d* of the first coil 41 across a predetermined distance in the z-axis direction. The magnetized surface 68 of the magnet 64 attached to the movable yoke 72 faces the underside coil surface 42*d* of the second coil 42 across a predetermined distance in the z-axis direction. When the movable portion 70 is in its reference position, the magnetized surface 68 of each magnet is positioned to face a center portion of the corresponding one of the coil surfaces 41*u*, 41*d*, 42*u*, and 42*d*.

Figure 6:
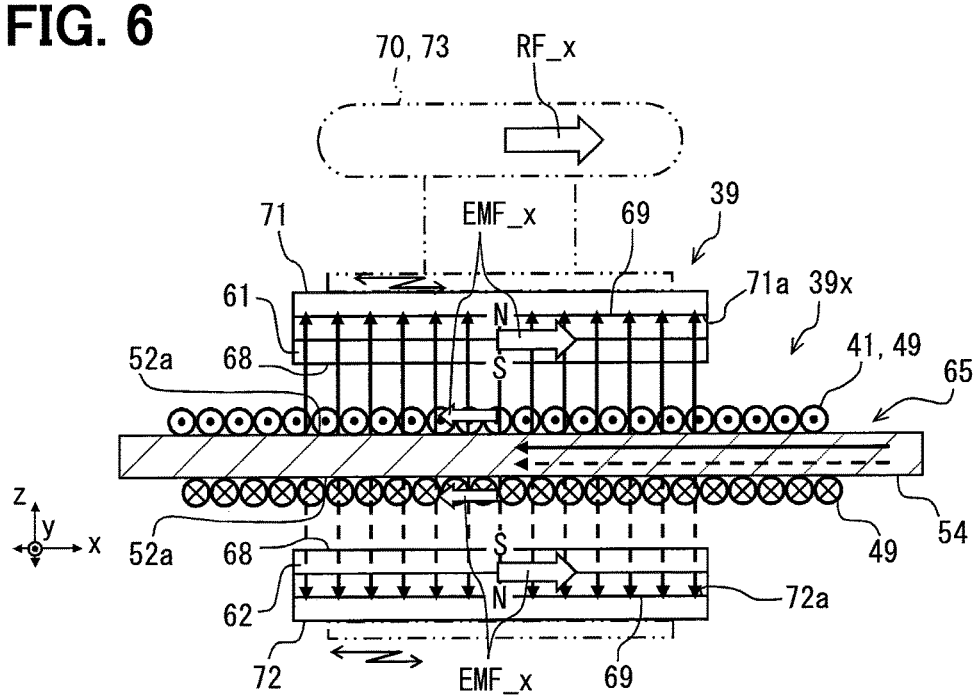
FIG. 6 is a schematic view illustrating magnetic flux around a magnetic circuit in a cross-sectional view taken along a VI-VI line of FIG. 5.

In the above configuration, as shown in FIG. 6, the magnetic flux generated by each of the magnets 61 and 62 passes (penetrates) through the winding 49 of the first coil 41 in the z-axis direction. Therefore, when an electric current is applied to the first coil 41 causing electric charges to move in the winding 49 placed in a magnetic field, each electric charge generates a Lorentz force. In this way, the first VCM 39*x* causes electromagnetic force EMF_x in the x-axis direction (first direction) to be generated between the first coil 41 and the magnets 61 and 62. When the direction of the electric current applied to the first coil 41 is reversed, the direction of the electromagnetic force EMF_x generated is also reversed in the x-axis direction.

Figure 7:
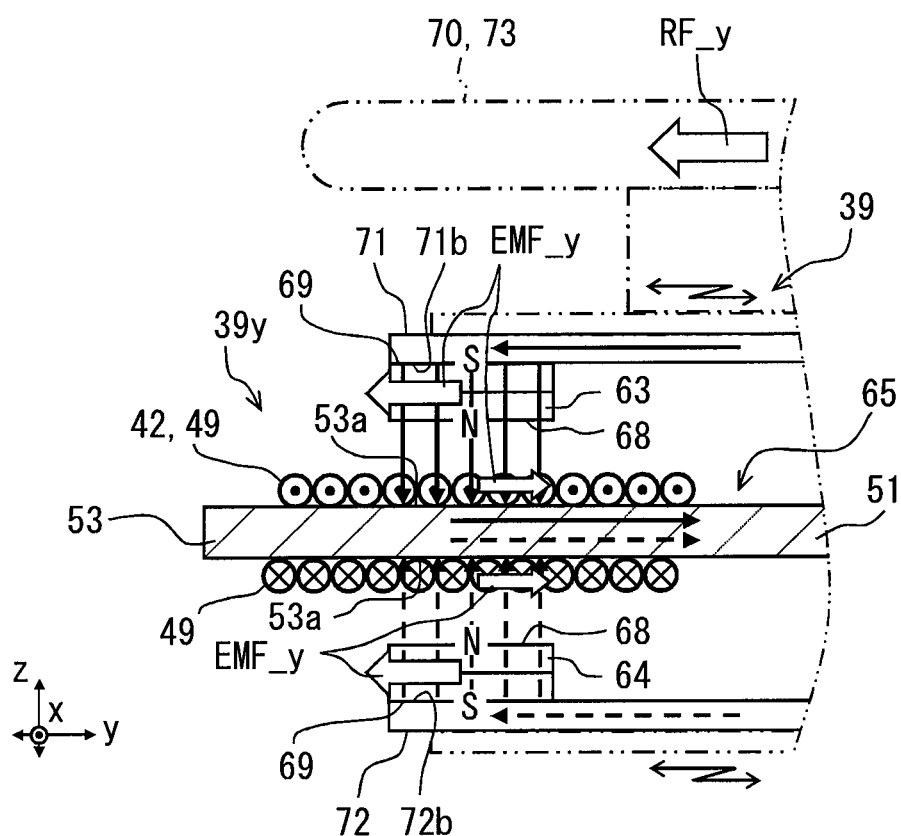
FIG. 7 is a schematic view illustrating magnetic flux around a magnetic circuit in a cross-sectional view taken along a VII-VII line of FIG. 5.

As shown in FIG. 7, the magnetic flux generated by each of the magnets 63 and 64 passes (penetrates) through the winding 49 of the second coil 42 in the z-axis direction. Therefore, when an electric current is applied to the second coil 42 causing electric charges to move in the winding 49 placed in a magnetic field, each electric charge generates a Lorentz force. In this way, the second VCM 39*y* causes electromagnetic force EMF_y in the y-axis direction (second direction) to be generated between the second coil 42 and the magnets 63 and 64. When the direction of the electric current applied to the second coil 42 is reversed, the direction of the electromagnetic force EMF_y generated is also reversed in the y-axis direction.

The fixed yoke 51 shown in FIGS. 3 to 5 is formed of a magnetic material, for example, soft iron or a magnetic steel sheet. The fixed yoke 51 includes two coil side yoke parts 52 and 53 and a connection part 54. The coil side yoke parts 52, 53 and the connection part 54 are each formed into a flat plate shape.

The coil side yoke part (hereinafter referred to as the "first coil side yoke part") 52 is inserted in and through the accommodation space 41*a* of the first coil 41. Opposite surfaces of the first coil side yoke part 52 accommodated in the accommodation space 41*a* have first opposing surfaces 52*a*. The two first opposing surfaces 52*a* are positioned on the inner periphery side of the first coil 41 such that the first coil 41 is sandwiched between the two first opposing surfaces 52*a* on the inner periphery side of the first coil 41 and the two magnets 61 and 62 positioned on the outer periphery side of the first coil 41 and such that the two first opposing surfaces 52a face the magnetized surfaces 68 of the magnets 61 and 62, respectively. The magnetic flux generated by each of the magnets 61 and 62 and induced into the first coil side yoke part 52 passes (penetrates) through the winding 49 of the first coil 41 in the z-axis direction.

The other coil side yoke part (hereinafter referred to as the "second coil side yoke part") 53 is inserted in and through the accommodation space 42a of the second coil 42. Opposite surfaces of the second coil side yoke part 53 accommodated in the accommodation space 42a have second opposing surfaces 53a. The two second opposing surfaces 53a are positioned on the inner periphery side of the second coil 42 such that the second coil 42 is sandwiched between the two second opposing surfaces 53a on the inner periphery side of the second coil 42 and the two magnets 63 and 64 positioned on the outer periphery side of the second coil 42 and such that the two second opposing surfaces 53a face the magnetized surfaces 68 of the magnets 63 and 64, respectively. The magnetic flux generated by each of the magnets 63 and 64 and induced into the second coil side yoke part 53 passes (penetrates) through the winding 49 of the second coil 42 in the z-axis direction.

The connection part 54 is bent into a L-shape along each coil 41, 42. The connection part 54 is extended from the first coil side yoke part 52 accommodated in the first coil 41 to the second coil side yoke part 53 accommodated in the second coil 42. Thus, the two coil side yoke parts 52 and 53 are connected with each other by the connection part 54. Accordingly, the fixed yoke 51 extended from the accommodation chamber 41a of the first coil 41 to the accommodation chamber 42a of the second coil 42 is formed.

Each of the movable yokes 71 and 72 is, similarly to the fixed yoke 51, formed of a magnetic material, for example, soft iron or electromagnetic steel plate. The movable yokes 71 and 72 are each formed of a flat rectangular plate, and have shapes substantially identical to each other. The movable yokes 71 and 72 are arranged parallel at both sides of the fixed yoke 51 (the first coil side yoke part 52, the second coil side yoke part 53). The movable yokes 71 and 72 are positioned to oppose each other across the two coils 41 and 42 in the z-axis direction, and are held by the knob base 74.

The movable yoke 71, 72 has a first holding surface 71a, 72a and a second holding surface 71b, 72b. The first holding surface 71a of the movable yoke 71 holds the mounting surface 69 of the magnet 61, and the second holding surface 71b of the movable yoke 71 holds the mounting surface 69 of the magnet 63. The first holding surface 72a of the other movable yoke 72 holds the mounting surface 69 of the magnet 62, and the second holding surface 72b of the other movable yoke 72 holds the mounting surface 69 of the magnet 64.

A repulsion magnet 55 (FIG. 9-FIG. 11) is disposed at the first coil side yoke part 52 and the second coil side yoke part 53. The repulsion magnet 55 has an approximately rectangular plane shape, and the longitudinal direction of the repulsion magnet 55 corresponds to the y-axis. The repulsion magnet 55 is disposed at each of the coil side yoke parts 52 and 53, for example, on the surface opposing the movable yoke 72 to generate repulsive force to the opposing magnet 62, 64.

The repulsion magnet 55 cancels the resultant (unbalance) of the magnetic attraction force (the first attraction force) between the magnet 61 and the first coil side yoke part 52 and the magnetic attraction force (the second attraction force) between the magnet 62 and the first coil side yoke part 52. Similarly, the repulsion magnet 55 offsets the resultant (unbalance) of the magnetic attraction force (the first attraction force) between the magnet 63 and the second coil side yoke part 53 and the magnetic attraction force (the second attraction force) between the magnet 64 and the second coil side yoke part 53 (the details are mentioned later).

When the repulsion magnet 55 is projected in the direction (z-axis direction) in which the yokes 51, 71, and 72 overlap with each other, the repulsion magnet 55 overlaps with the magnet 62, 64. Therefore, while the position of the movable yoke 71, 72 is moved by the operation knob 73, the overlap area between the magnets 55 and 62 and between the magnets 55 and 64 is set to be always constant (FIG. 9) within the movable range of the movable yoke 71, 72 in response to the input of operation force.

Figure 8:
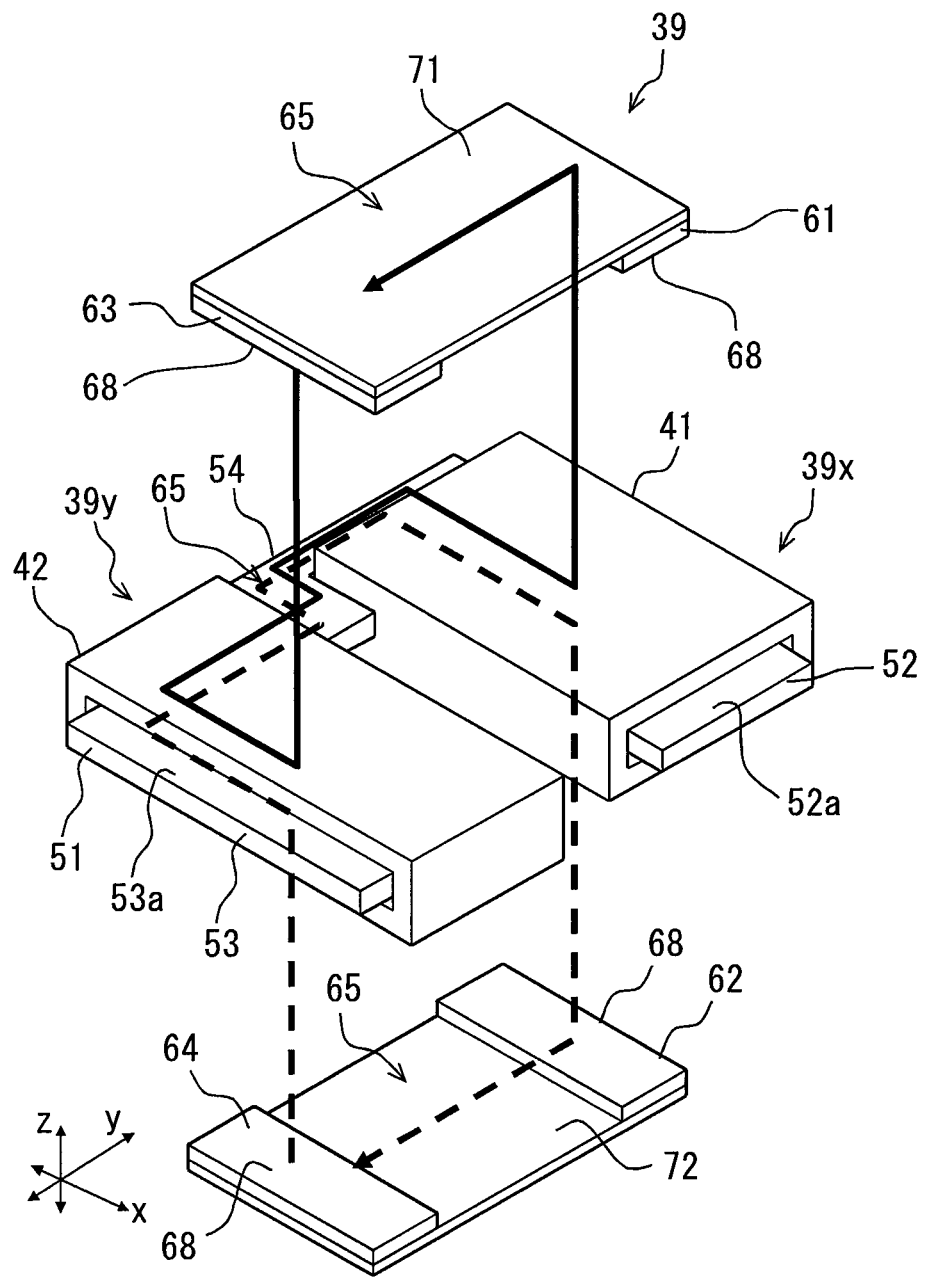
FIG. 8 is an exploded perspective view of the reaction force generator illustrating magnetic flux around a magnetic circuit.

The fixed yoke 51, the two movable yokes 71 and 72, and so on described above form a magnetic circuit 65 of the reaction force generator 39 shown in FIG. 6 through FIG. 8 as a magnetic path forming body 66. In the magnetic circuit 65, magnetic fluxes flow around via the fixed yoke 51 and the respective movable yokes 71 and 72. Hence, magnetic fluxes generated by the respective magnets 61 and 62 of the first VCM 39x are led to the second VCM 39y and magnetic fluxes generated by the respective magnets 63 and 64 of the second VCM 39y are led to the first VCM 39x.

More specifically, in the respective magnets 61 and 62 of the first VCM 39x shown in FIG. 6 through FIG. 8, magnetic poles of the respective magnetized surfaces 68 facing the first coil 41 are same. Hence, directions of magnetic fluxes generated by the respective magnets 61 and 62 are opposite to each other along the z-axis direction. Magnetic fluxes heading for the respective first holding surfaces 71a and 72a from the corresponding first counter surface 52a are thus generated. The magnetic fluxes thus generated enter the movable yokes 71 and 72 from the first holding surfaces 71a and 72a, respectively. In the movable yokes 71 and 72, the magnetic fluxes head for the second holding surfaces 71b and 72b from the first holding surfaces 71a and 72a, respectively.

In the respective magnets 63 and 64 of the second VCM 39y shown in FIG. 7 and FIG. 8, magnetic poles of the respective magnetized surfaces 68 facing the second coil 42 are same and different from the magnetic poles of the two magnetized surfaces 68 opposing the first coil 41 (see also FIG. 6). Hence, directions of magnetic fluxes generated by the respective magnets 63 and 64 are opposite to each other along the z-axis direction. Magnetic fluxes heading for the respective second counter surface 53a from the corresponding second holding surfaces 71b and 72b are thus generated. The magnetic fluxes led by the respective movable yokes 71 and 72 in the manner as above enter the second coil-side yoke portion 53 from the respective second counter surfaces 53a and head for the first coil-side yoke portion 52 by passing through the connection part 54. The magnetic fluxes led into the fixed yoke 51 head again for the first holding surfaces 71a and 72a (see FIG. 6) from the corresponding first counter surfaces 52a.

In the manner as above, in the reaction force generator 39 shown in FIG. 6 through FIG. 8, magnetic fluxes generated by the respective magnets 61 and 62 of the first VCM 39x not only pass through the first coil 41 of the first VCM 39x but are also led by the magnetic circuit 65 and pass through the second coil 42 of the second VCM 39y. Likewise, magnetic fluxes generated by the respective magnets 63 and 64 of the second VCM 39y not only pass through the second coil 42 but are also led by the magnetic circuit 65 and pass through the first coil 41 of the first VCM 39x. Hence, density of magnetic fluxes between the respective first counter surfaces 52a and the corresponding first holding surfaces 71a and 72a and density of magnetic fluxes between the respective second counter surfaces 53a and the corresponding second holding surfaces 71b and 72b are both higher than in a configuration where a magnetic circuit is formed separately for the two VCMs 39x and 39y. Because density of magnetic fluxes penetrating through the coiled wire 49 of the first coil 41 in the z-axis direction increases, electromagnetic forces EMF_x that can be generated by the first VCM 39x increase. Likewise, because density of magnetic fluxes penetrating through the coiled wire 49 of the second coil 42 in the z-axis direction increases, electromagnetic forces EMF_y that can be generated by the second VCM 39y increase. Hence, operation reaction forces RF_x and RF_y acting on the operation knob 73 of the movable portion 70 and hence the operator can be increased while reducing an amount of materials used to form the respective magnets 61 through 64.

Next, the operation of the repulsion magnet 55, that is, the action controlling the magnetic attraction force to the fixed yoke 51 by each of the magnets 61-64 is explained using FIG. 9-FIG. 14.

Figure 12:
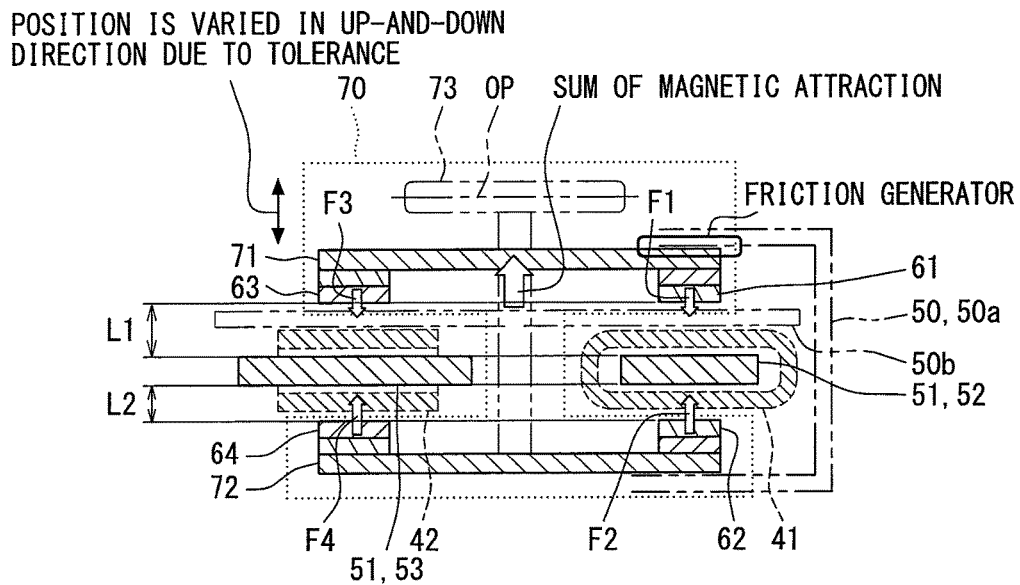
FIG. 12 is a diagram in which a frictional force occurs by a resultant of magnetic attraction force in case where there is no repulsion magnet.

As shown in FIG. 12, a distance between the magnet 61 and the first coil side yoke part 52 and a distance between the magnet 63 and the second coil side yoke part 53 are set to L1. Further, a distance between the magnet 62 and the first coil side yoke part 52 and a distance between the magnet 64 and the second coil side yoke part 53 are set to L2. Moreover, the magnetic attraction force of the magnet 61 to the first coil side yoke part 52 is defined as F1, the magnetic attraction force of the magnet 62 to the first coil side yoke part 52 is defined as F2, the magnetic attraction force of the magnet 63 to the second coil side yoke part 53 is defined as F3, and the magnetic attraction force of the magnet 64 to the second coil side yoke part 53 is defined as F4.

In case where the repulsion magnet 55 is not disposed, if the distance L1 becomes larger than the distance L2 depending on, for example, the setting of the sliding board 50b disposed between the coil 41, 42 and the magnet 61, 63, or the attachment variation of the components, the magnetic attraction force F1, F3 of the magnet 61, 63 becomes smaller than the magnetic attraction force F2, F4 of the magnet 62, 64. Therefore, the magnetic attraction force F1, F3 and the magnetic attraction force F2, F4 cannot be made offset. In this case, the resultant of magnetic attraction force totally becomes a force heading to the upper side. As a result, for example, the movable yoke 71 will be pushed against the housing 50a, and the frictional force is generated at the time of movement. That is, the sliding resistance increases, and variation will occur in the operation feeling by the operation knob 73.

Figure 9:
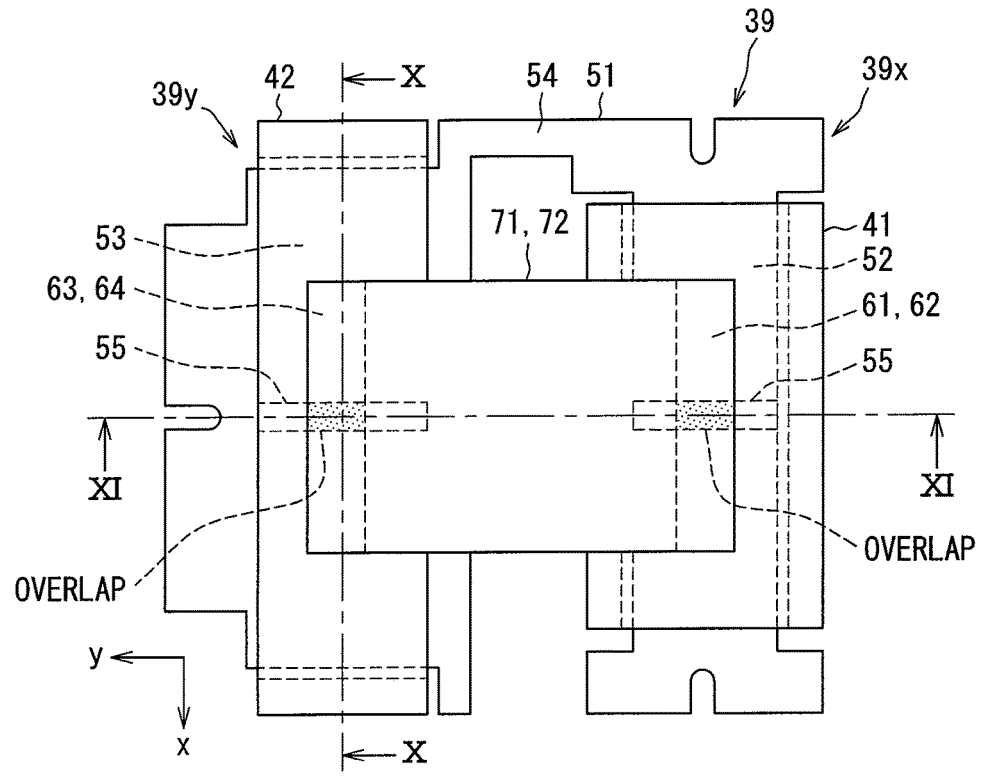
FIG. 9 is a plan view illustrating the reaction force generator.
Figure 10:
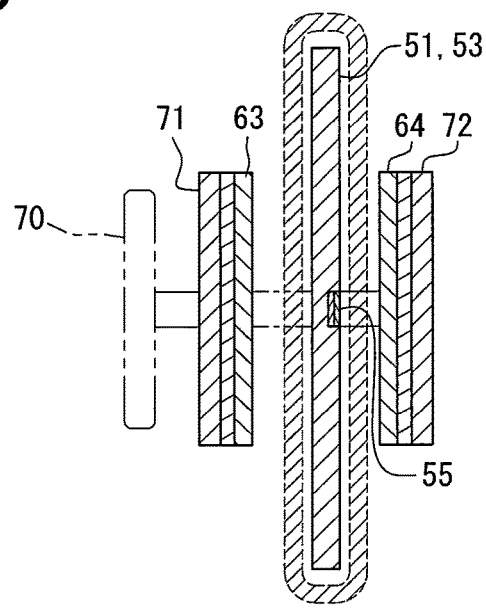
FIG. 10 is a cross-sectional view taken along a X-X line of FIG. 9.
Figure 11:
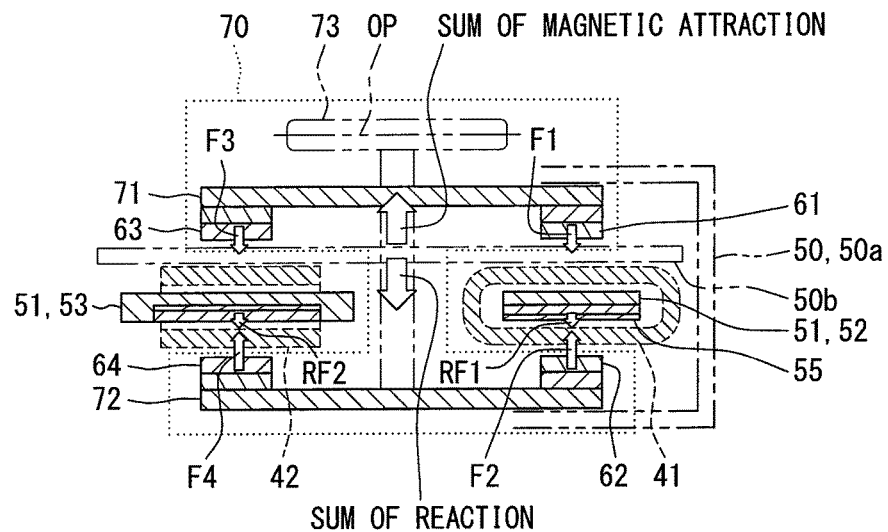
FIG. 11 is a cross-sectional view taken along a XI-XI line of FIG. 9 illustrating a resultant of magnetic attraction force and a resultant of reaction force.

However, as shown in FIG. 9-FIG. 11, in this embodiment, the repulsion magnet 55 to generate repulsive force is disposed in the first coil side yoke part 52 and the second coil side yoke part 53 so that the resultant of the magnetic attraction forces F1-F4 can be cancelled. As shown in FIG. 11, due to the repulsion magnet 55, a repulsive force RF1 occurs to the magnet 62 in the first coil side yoke part 52, and a repulsive force RF2 occurs to the magnet 64 in the second coil side yoke part 53. The resultant of magnetic attraction forces can be cancelled by the resultant of the repulsive forces RF1 and RF2. Therefore, it becomes possible to effectively restrict the influence caused by the difference in the magnetic attraction force between the magnet 61, 63 and the magnet 62, 64.

Figure 13:
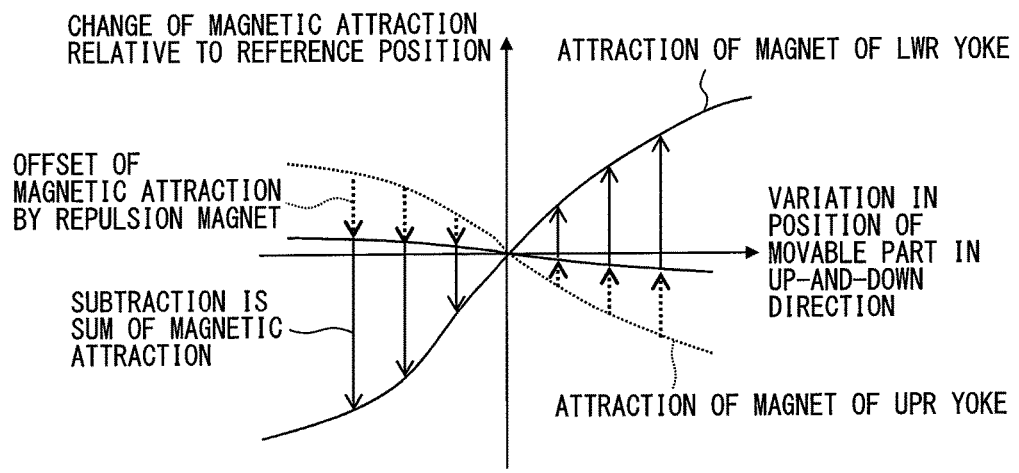
FIG. 13 is a graph illustrating a change amount of magnetic attraction force in case where there is a repulsion magnet.
Figure 14:
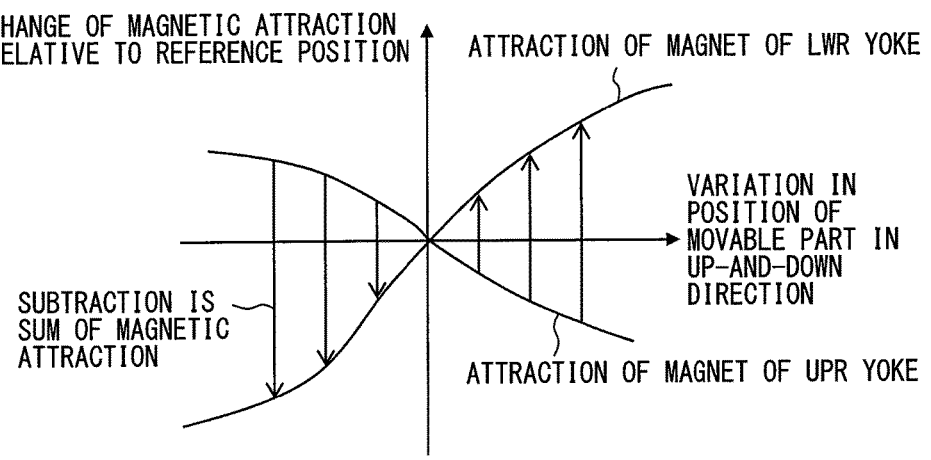
FIG. 14 is a graph illustrating a change amount of magnetic attraction force in case there is no repulsion magnet.

The above-mentioned contents are explained supplementarily using FIG. 13 and FIG. 14. As shown in FIG. 14, when the repulsion magnet 55 is not used, when the positions of the movable yoke 71 and the movable yoke 72 are varied in the up-and-down direction (z-axis direction), a difference is generated between the magnetic attraction force of the magnet 62, 64 of the movable yoke 72 on the lower side and the magnetic attraction force of the magnet 61, 63 of the movable yoke 71 on the upper side, as a change in the magnetic attraction force. As the variation in the positions of the yokes 71 and 72 is increased, the amount of change in the magnetic attraction force is increased. This causes variation in the frictional force to affect the sliding feeling.

In contrast, as shown in FIG. 13, when the repulsion magnet 55 is used, since the repulsion magnet 55 produces the repulsive force for offsetting the resultant of magnetic attraction force, it becomes possible to restrict the change in the magnetic attraction force.

Moreover, as shown in FIG. 9, the overlap area between the magnets 55 and 62 is set always constant, and the overlap area between the magnets 55 and 64 is set always constant, in the movable range of the movable yoke 71, 72 in response to the input of operation force. Therefore, the repulsive force can be restricted from changing when the movable yoke 71, 72 is moved. The above-mentioned effect can be stably acquired irrespective to the operation position.

In the first embodiment, the operation input device 100 corresponds to an "input device". The first VCM 39x corresponds to a "first actuator", and the second VCM 39y corresponds to a "second actuator." Moreover, the first coil 41 corresponds to a "coil." The magnets 61 and 62 correspond to "first magnet and second magnet." The first coil side yoke part 52 corresponds to a "coil side part." The movable yokes 71 and 72 correspond to "first yoke and second yoke."

(Other Embodiment)

Although the reaction force generator 39 is equipped with the first VCM 39x and the second VCM 39y as an actuator in the first embodiment, the reaction force generator 39 may have only one of the first VCM 39x and the second VCM 39y, without being limited to the first embodiment. In this case, the operation reaction force is acquired in only one of two directions (x-axis, y-axis). However, the influence caused by the resultant of magnetic attraction force can be restricted, similarly to the first embodiment, by arranging the repulsion magnet 55.

The first embodiment may be modified in such a manner that the fixed yoke 51 is replaced with a movable yoke and all the magnets 61 through 64 are provided to the newly provided movable yoke while the opposing movable yokes 71 and 72 are replaced with fixed yokes. In such a case, an effect same as the effect achieved in the first embodiment above can be obtained by providing the repulsion magnet 55 to one of the newly provided fixed yokes.

The first embodiment may be modified in such a manner that the fixed yoke 51 is replaced with a movable yoke and the opposing movable yokes 71 and 72 are replaced with fixed yokes. Then, all the magnets 61 through 64 are provided to the newly provided fixed yoke. In such a case, the repulsion magnet 55 is placed on either surface of the newly provided movable yoke, such that an effect same as the effect achieved in the first embodiment above can be obtained.

The first embodiment may be modified in such a manner that the magnets 61 through 64 are stored in the storage chambers 41a and 42a of the coils 41 and 42, respectively, and fixed to the corresponding counter surfaces 52a and 53a of the fixed yoke 51. In such a case, an effect same as the effect achieved in the first embodiment above can be obtained by providing the repulsion magnet 55 on either surface of the movable yoke 71, 72.

The first embodiment may be modified in such a manner that the display system 10 includes a head-up display device 120 (see FIG. 2) instead of or in addition to the navigation device 20. The head-up display device 120 is stored in the instrument panel of the vehicle in front of the driver's seat and shows an image virtually by projecting the image to a projection region 122 defined within a windshield. The operator seated in the driver's seat becomes able to visually confirm multiple icons correlated with preliminarily assigned functions and a pointer 80 and so on used to select a desired icon through the projection region 122. As with the pointer 80 displayed on the display screen 22, the pointer 80 can be moved across the projection region 122 in a direction corresponding to an input direction of an operation force by an input of an operation in a horizontal direction into the operation knob 73.

The first embodiment has described the operation input device set in the center console as a remote-control device to operate the navigation device or the like. It should be appreciated, however, that the input device of the present disclosure is also applicable to a selector, such as a shift lever provided to the center console, a steering switch provided to a steering wheel, and so on. The input device of the present disclosure is also applicable to an instrument panel, an arm rest provided to a door or the like, and various devices provided near back seats or the like to operate functions furnished to the vehicle. Applications of the operation input device of the present disclosure are not limited to vehicular devices and the operation input device of the present disclosure can be also adopted as a general operation system used in various transportation devices and various information terminals.

What is claimed is:

1. An input device in which an operation force is input in a direction along an imaginary operation plane, the input device comprising:
    a coil defined by winding a wire;
    a coil side yoke having a plane shape inserted in the coil;
    a first yoke and a second yoke each having a plane shape and arranged parallel at both sides of the coil side yoke;
    a first magnet that generates magnetic flux between the coil side yoke and the first yoke, the first magnet being arranged at a surface of the coil side yoke and the first yoke opposing with each other;
    a second magnet that generates magnetic flux between the coil side yoke and the second yoke, the second magnet being arranged at a surface of the coil side yoke and the second yoke opposing with each other;
    an operation knob connected to the coil side yoke or the first and second yokes, into which the operation force is inputted, wherein an electromagnetic force generated by applying current to the coil acts on the operation knob as a reaction force of the operation force; and
    a repulsion magnet disposed at one of the coil side yoke, the first yoke, and the second yoke to generate a repulsive force to the first magnet or the second magnet so as to cancel a sum of a first attraction force of the first magnet to the coil side yoke or the first yoke and a second attraction force of the second magnet to the coil side yoke or the second yoke.

2. The input device according to claim 1, wherein the repulsion magnet overlaps the first magnet or the second magnet with an overlap area when being projected in a direction in which the coil side yoke overlaps the first yoke and the second yoke, and the overlap area is set to be uniform in a movable range of the coil side yoke or the first and second yokes in response to the input of the operation force.

3. The input device according to claim 1, wherein two sets of the coil, the coil side yoke, the first yoke, the second yoke, the first magnet, and the second magnet define a first actuator and a second actuator,
the electromagnetic force generated by the coil in the first actuator is inputted into the operation knob as a reaction force of an operation in a first direction along the operation plane, and
the electromagnetic force generated by the coil in the second actuator is inputted into the operation knob as a reaction force of an operation in a second direction along the operation plane, the second direction intersecting the first direction.

\* \* \* \* \*